(12) United States Patent
Okuno

(10) Patent No.: US 6,297,895 B1
(45) Date of Patent: Oct. 2, 2001

(54) WAVELENGTH DIVISION MULTIPLEXING SYSTEM, WAVELENGTH DIVISION MULTIPLEXING TRANSMISSION SYSTEM AND OPTICAL PATH CROSS CONNECTION SYSTEM

(75) Inventor: Hideki Okuno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/007,981

(22) Filed: Jan. 16, 1998

(30) Foreign Application Priority Data

Jan. 17, 1997 (JP) .................................................. 9-038641

(51) Int. Cl.$^7$ ...................................................... H04J 14/02
(52) U.S. Cl. ........................... 359/124; 359/127; 359/133
(58) Field of Search ..................................... 359/124, 133, 359/127

(56) References Cited

U.S. PATENT DOCUMENTS

| | | |
|---|---|---|
| 4,466,694 | 8/1984 | MacDonald . |
| 5,121,453 | 6/1992 | Orazi et al. . |
| 5,170,451 | 12/1992 | Ohshima . |
| 5,177,803 | 1/1993 | Newhouse et al. . |
| 5,467,212 * | 11/1995 | Huber .................... 359/168 |
| 5,479,547 * | 12/1995 | Kunikane et al. ............. 385/47 |
| 5,612,805 * | 3/1997 | Fevrier et al. ............. 359/124 |
| 5,646,399 * | 7/1997 | Fukushima et al. ............ 250/226 |
| 5,764,821 * | 11/1995 | Glance ..................... 385/14 |
| 5,771,112 * | 6/1998 | Hamel et al. ............. 359/128 |
| 5,801,858 * | 9/1998 | Roberts et al. ............ 359/114 |
| 5,905,827 * | 5/1999 | Naganuma et al. ............ 385/31 |
| 5,917,625 * | 6/1999 | Ogusu et al. ............. 359/130 |
| 5,936,763 * | 8/1999 | Mitsuda et al. ............ 359/341 |
| 6,084,694 * | 7/2000 | Milton et al. ............. 359/124 |
| 6,091,538 * | 7/2000 | Takeda et al. ............. 359/341 |

FOREIGN PATENT DOCUMENTS

| | | |
|---|---|---|
| 56-150706 | 11/1981 | (JP) . |
| 57-14806 | 1/1982 | (JP) . |
| 2-87841 | 3/1990 | (JP) . |
| 02-87841 * | 3/1990 | (JP) ..................................... 359/124 |
| 4-37225 | 2/1992 | (JP) . |
| 4-220602 | 8/1992 | (JP) . |
| 4-220603 | 8/1992 | (JP) . |
| 5-292558 | 11/1993 | (JP) . |
| 6-252890 | 9/1994 | (JP) . |
| 6-258545 | 9/1994 | (JP) . |
| 6-311108 | 11/1994 | (JP) . |
| 7-231305 | 8/1995 | (JP) . |
| 62-35084 | 7/1997 | (JP) . |

OTHER PUBLICATIONS

Japanese Office Action, dated Nov. 30, 1999, with English language translation of Japanese Examiner's comments.

* cited by examiner

*Primary Examiner*—Leslie Pascal
*Assistant Examiner*—Hanh Phan
(74) *Attorney, Agent, or Firm*—McGuireWoods, LLP

(57) ABSTRACT

Disclosed is a method for wavelength-multiplexing signal lights with three or more wavelengths, wherein: a wavelength arrangement is made by providing at least a wavelength block of signal light with one wavelength and a wavelength block where signal lights with two or more wavelengths are wavelength-multiplexed or providing a plurality of wavelength blocks where signal lights with two or more wavelengths are wavelength-multiplexed, and by setting a wavelength interval between adjacent wavelength blocks to be wider than a wavelength interval between signal lights in a wavelength block.

16 Claims, 8 Drawing Sheets

(RECEPTION) (TRANSMISSION)

(RECEPTION) (TRANSMISSION)

ately used to transmit signal lights with different wavelengths on an optical transmission line so as to enchance the transmission capacity. In the wavelength division multiplexing systems, multiplexing at a transmitter and demultiplexing at a receiver are needed and multiplex and demultiplex losses occur at the transmitter and receiver, respectively.

WAVELENGTH DIVISION MULTIPLEXING SYSTEM, WAVELENGTH DIVISION MULTIPLEXING TRANSMISSION SYSTEM AND OPTICAL PATH CROSS CONNECTION SYSTEM

FIELD OF THE INVENTION

This invention relates to a wavelength division multiplexing system, a wavelength division multiplexing transmission system, and an optical path cross connection system.

BACKGROUND OF THE INVENTION

Optical wavelength division multiplexing (hereinafter also referred to as 'wavelength multiplexing') systems are generally used to transmit signal lights with different wavelengths on an optical transmission line so as to enchance the transmission capacity. In the wavelength division multiplexing systems, multiplexing at a transmitter and demultiplexing at a receiver are needed and multiplex and demultiplex losses occur at the transmitter and receiver, respectively.

However, in the conventional wavelength division multiplexing systems using the wavelength multiplexing and demultiplexing, wavelength multiplexing and demultiplexing couplers that are needed are difficult to fabricate. This is because the wavelength interval between adjacent signal lights is so narrow.

On the other hand, in the conventional wavelength division multiplexing system employing the directional coupler, the demultiplex and multiplex losses are substantial. This is because the demultiplexing or multiplexing by the directional coupler causes a theoretical demultiplex or multiplex loss.

SUMMARY OF THE INVENTION

Accordingly, it is an object of the invention to provide a wavelength multiplexing transmission system where wavelength multiplexing and demultiplexing couplers are easy to fabricate.

It is a further object of the invention to provide a wavelength multiplexing transmission system where multiplex and demultiplex losses can be reduced.

According to the invention, provided is a method for wavelength-multiplexing signal lights with three or more wavelengths, wherein: a wavelength arrangement is made by providing at least a wavelength block of signal light with one wavelength and a wavelength block where signal lights with two or more wavelengths are wavelength-multiplexed or providing a plurality of wavelength blocks where signal lights with two or more wavelengths are wavelength-multiplexed, and by setting a wavelength interval between adjacent wavelength blocks to be wider than a wavelength interval between signal lights in a wavelength block.

According to another aspect of the invention, provided is a wavelength multiplexing transmission system for transmitting signal lights with three or more wavelengths through an optical fiber transmission line, wherein: a wavelength arrangement is made by providing at least a wavelength block of signal light with one wavelength and a wavelength block where signal lights with two or more wavelengths are wavelength-multiplexed or providing a plurality of wavelength blocks where signal lights with two or more wavelengths are wavelengths-multiplexed, and by setting a wavelength interval between adjacent wavelength blocks to be wider than a wavelength interval between signal lights in a wavelength block.

According to another aspect of the invention, provided is an optical path cross connection system for exchanging wavelength-multiplexed signal light where signal lights with three or more wavelengths are wavelength-multiplexed, wherein: a wavelength arrangement is made by providing at least a wavelength block of signal light with one wavelength and a wavelength block where signal lights with two or more wavelengths are wavelength-multiplexed or providing a plurality of wavelength blocks where signal lights with two or more wavelengths are wavelength-multiplexed, and by setting a wavelength interval between adjacent wavelength blocks to be wider than a wavelength interval between signal lights in a wavelength block.

In this invention, the wavelength arrangement of signal light is made with unequal wavelength interval, but a wavelength block composed of single wavelength or several wavelengths with a narrow interval, where the wavelength interval between adjacent wavelength blocks is set to be wider than the wavelength interval in the wavelength block.

Therefore, the multiplexer and demultiplexer in the wavelength multiplexing transmission system of the invention can use partially a wavelength multiplexing and demultiplexing coupler. Namely, the number of directional coupler can be reduced and the multiplex and demultiplex losses can be thereby reduced.

BRIEF DESCRIPTION OF THE DRAWINGS

The invention will be explained in more detail in conjunction with the appended drawings, wherein.

DESCRIPTION OF THE PREFERRED EMBODIMENTS

Before explaining the preferred embodiments of the invention, the aforementioned conventional wavelength multiplexing transmission system will be explained.

Figure 1:
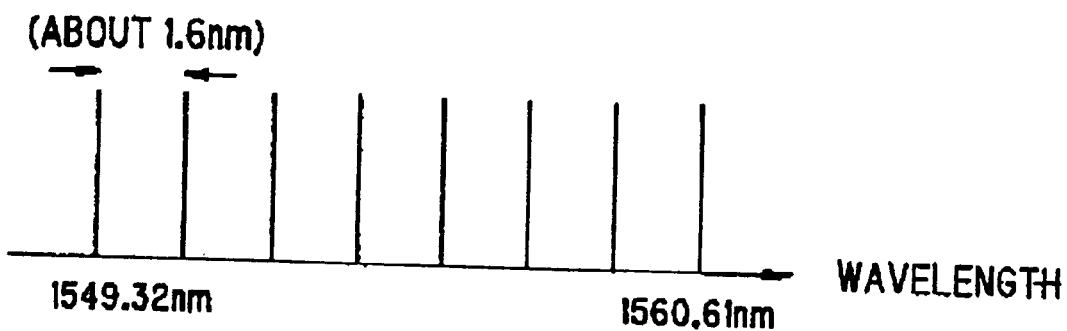
FIG. 1 is a diagram showing a wavelength arrangement in a conventional wavelength multiplexing transmission system.

FIG. 1 is an illustration showing an example of a wavelength arrangement for signal lights in a conventional eight-channel wavelength division multiplexing transmission system. The wavelength interval between adjacent signal lights is 200 GHz (about 1.6 nm) and the signal lights are arranged with the equal wavelength interval between 1549.32 nm and 1560.61 nm.

Figure 2:
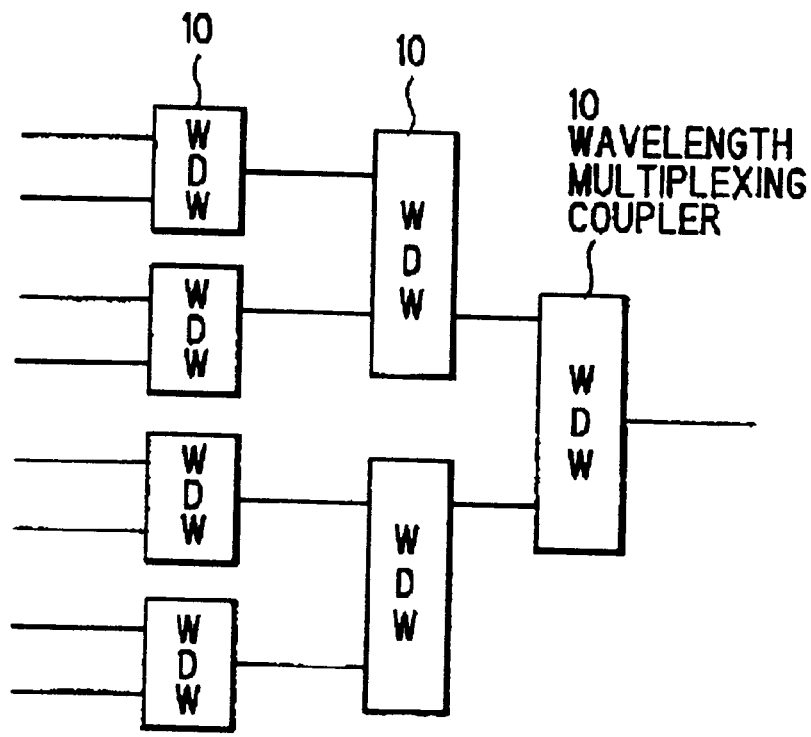
FIG. 2 is a block diagram showing a first example of an optical multiplexer in the conventional wavelength multiplexing transmission system.
Figure 3:
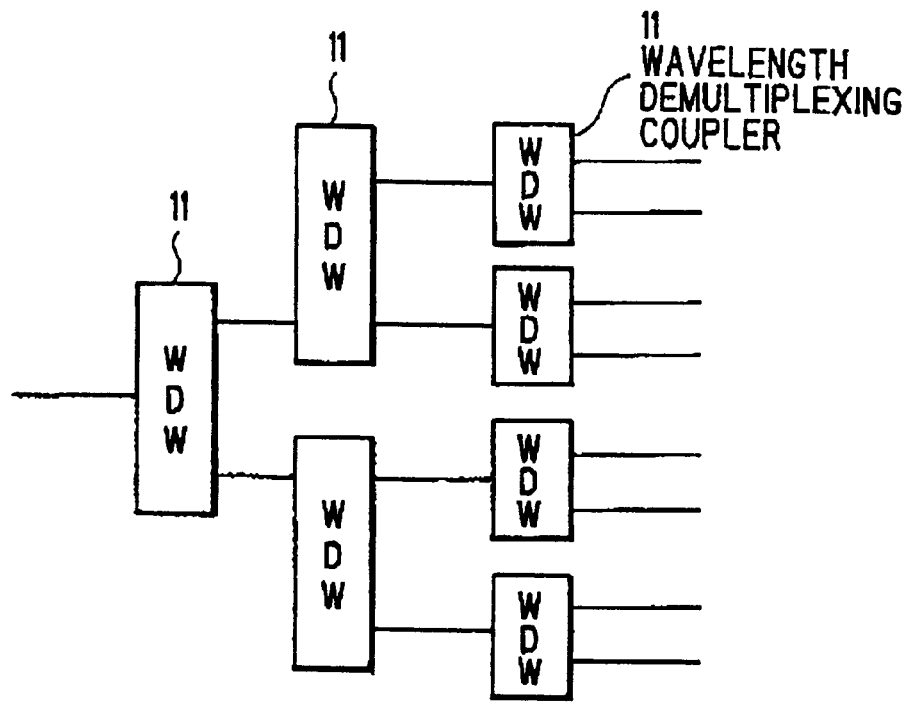
FIG. 3 is a block diagram showing a first example of an optical demultiplexer in the conventional wavelength multiplexing transmission system.

FIGS. 2 and 3 are block diagrams showing a first conventional example of optical multiplexer and demultiplexer used in the conventional wavelength division multiplexing transmission system. In the optical multiplexer shown in FIG. 2, at each of first-stage wavelength multiplexing couplers 10, two single-wavelength signal lights are multiplexed into two-wavelength-multiplexed signal light. Then, at each of second-stage wavelength multiplexing couplers 10, two groups of two-wavelength multiplexed signal lights are multiplexed into four-wavelength-multiplexed signal light. Then, at a third-stage wavelength multiplexing couplers 10, two groups of four-wavelength multiplexed signal lights are multiplexed into eight-wavelength-multiplexed signal light. On the other hand, in the optical demultiplexer shown in FIG. 3, at a first-stage wavelength demultiplexing coupler 11, two groups of four-wavelength-multiplexed signal lights are produced by wavelength-demultiplexing the eight-wavelength-multiplexed signal lights into the short-wave and long-wave parts by using their wavelength differences. Then, at two second-stage wavelength demultiplexing couplers 11, four groups of two-wavelength-multiplexed signal lights are produced by wavelength-demultiplexing each of the two groups of four-wavelength-multiplexed signal lights into short-wave and long-wave parts. Then, at four third-stage wavelength demultiplexing couplers 11, eight single-wavelength signal lights are produced by wavelength-demultiplexing each of the four groups of four-wavelength-multiplexed signal lights into short-wave and long-wave parts.

In the above optical demultiplexer of the first conventional example, the wavelength demultiplexing is conducted on all the stages and therefore the demultiplex loss is theoretically to be 0 dB. However, the demultiplex loss is exactly increased to a degree since the wavelength interval is narrowed to 200 GHz and therefore an ideal wavelength demultiplexing coupler 11 is very difficult to fabricate. Further, losses of the respective signal lights are dispersed. Therefore, such a composition is not typically employed.

Figure 4:
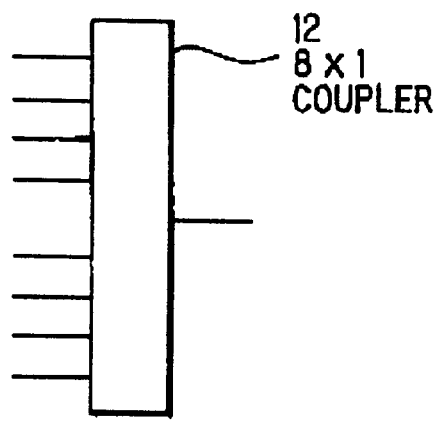
FIG. 4 is a block diagram showing a second example of optical multiplexer in the conventional wavelength multiplexing transmission system.
Figure 5:
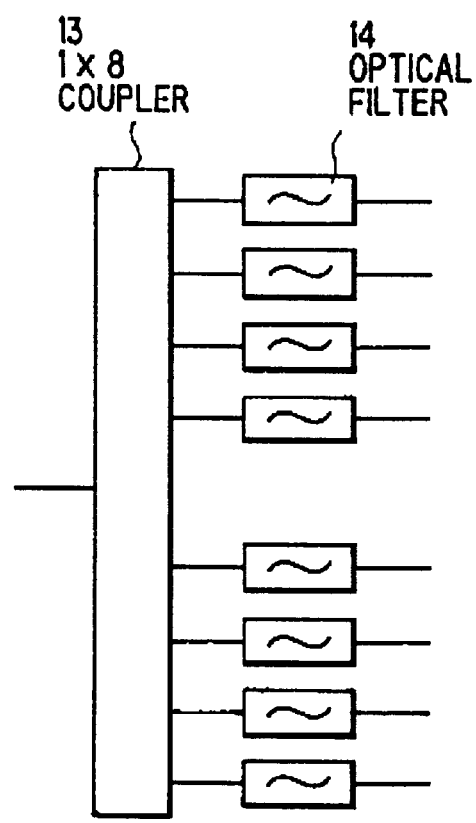
FIG. 5 is a block diagram showing a second example of an optical demultiplexer in conventional wavelength multiplexing transmission system.

FIGS. 4 and 5 are block diagrams showing a second conventional example of optical multiplexer and demultiplexer used in the conventional wavelength division multiplexing transmission system. In the optical multiplexer shown in FIG. 4, eight single-wavelength signal lights are coupled by a 8×1 coupler 12 to give wavelength-multiplexed signal light. On the other hand, in the optical demultiplexer shown in FIG. 5, wavelength-multiplexed signal light is divided into eight groups of eight-wavelength-multiplexed signal lights by a 1×8 coupler 13, and then each signal light with a necessary wavelength is taken out by an optical filter 14 to give eight single-wavelength signal lights. The 1×8 coupler 13 is typically used because it is easy to fabricate, while its theoretical demultiplex loss is not less than 9 dB since it is a directional coupler.

Next, a wavelength division multiplexing transmission system in the preferred embodiment will be explained below.

Figure 6:
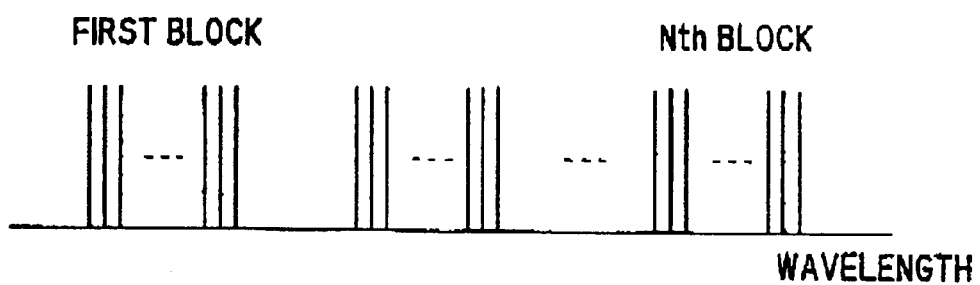
FIG. 6 is a diagram showing a wavelength arrangement in a wavelength multiplexing transmission system in a preferred embodiment according to the invention.

FIG. 6 shows a wavelength arrangement of signal lights in the wavelength division multiplexing transmission system. As shown in FIG. 6, the wavelengths of signal lights is not arranged with equal intervals but are divided into n blocks (first to n-th blocks) of several wavelengths with an interval between adjacent blocks.

Figure 7:
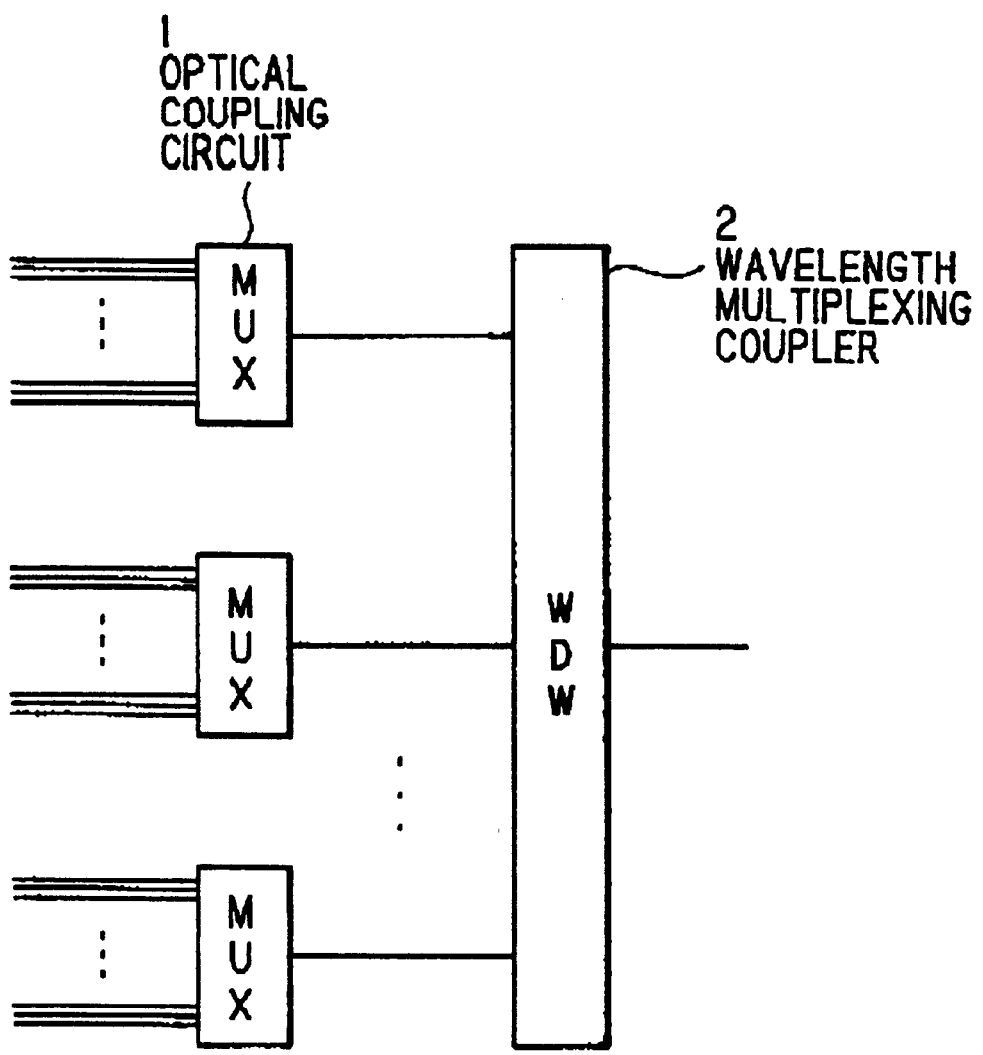
FIG. 7 is a block diagram showing an example of an optical multiplexer in the wavelength multiplexing transmission system in the embodiment.

FIG. 7 is a block diagram showing an example of an optical multiplexer used in the wavelength division multiplexing transmission system. Referring to FIG. 7, an optical coupling circuit 1 is an optical circuit or optical part for coupling several single-wavelength signal lights to be input in order to produce wavelength-multiplexed signal light. The output of the optical coupling circuit 1 is connected to the input of a wavelength multiplexing coupler 2. The wavelength multiplexing coupler 2 is an optical circuit or optical part for wavelength-multiplexing several single-wavelength signal lights or wavelength-multiplexed signal lights to be input in order to produce wavelength-multiplexed signal light.

The operation of the optical multiplexer in FIG. 7 will be explained below. Several single-wavelength signal lights to be input are coupled by the optical coupling circuit 1 to produce the first to n-th blocks of wavelength-multiplexed signal lights. Then, the first to n-th blocks of wavelength-multiplexed signal lights are wavelength-multiplexed by the wavelength multiplexing coupler 2 while using the intervals between adjacent blocks, thereby obtaining target wavelength-multiplexed signal light.

Figure 8:
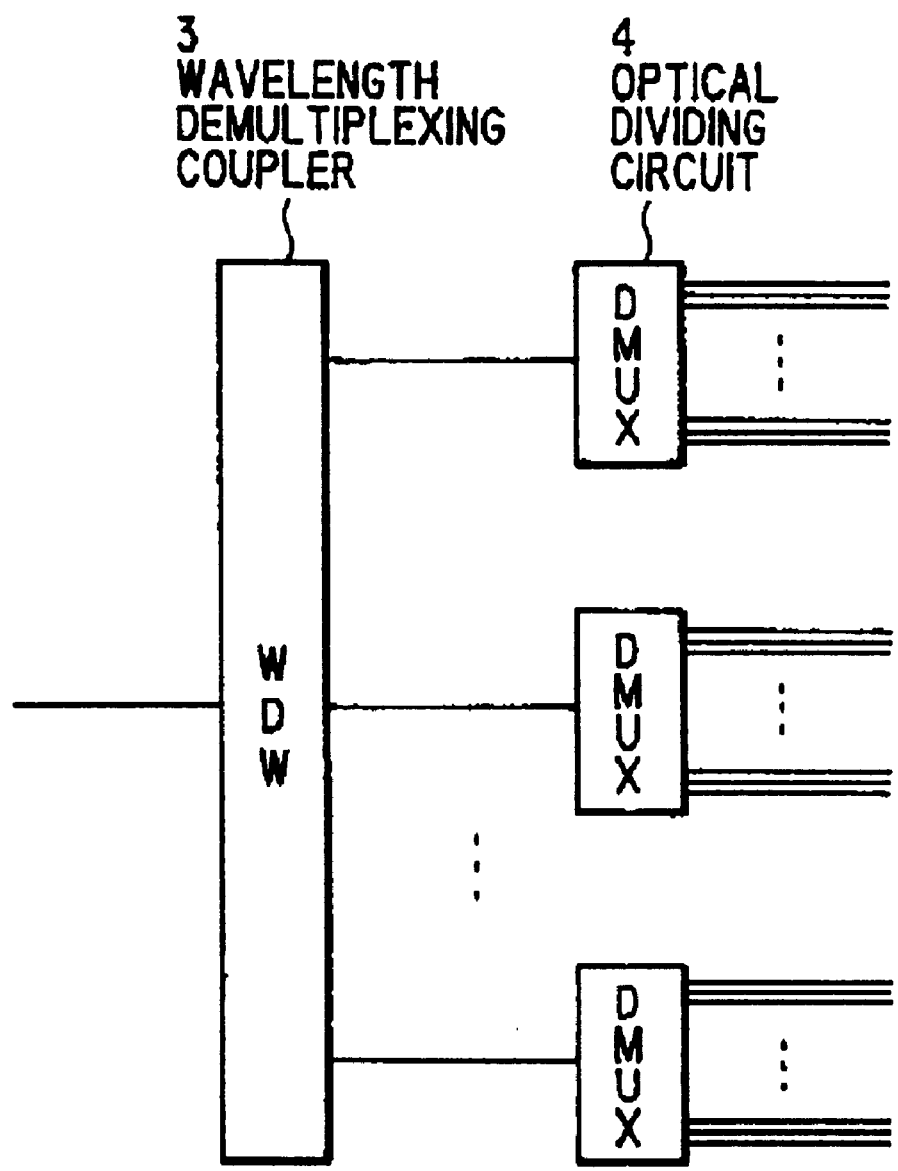
FIG. 8 is a block diagram showing an example of an optical demultiplexer in the wavelength multiplexing transmission system in the embodiment.

FIG. 8 is a block diagram showing an example of an optical demultiplexer used in the wavelength division multiplexing transmission system. Referring to FIG. 8, a wavelength demultiplexing coupler 3 is an optical circuit or optical part for demultiplexing wavelength-multiplexed signal light to be input in order to produce several single-wavelength signal lights or wavelength-multiplexed signal lights.

The wavelength-multiplexed signal light is wavelength-demultiplexed into the first to n-th blocks of wavelength-multiplexed signal lights while using the interval between adjacent blocks by the wavelength demultiplexing coupler 3. Then, target single-wavelength signal lights are obtained by using an optical dividing circuit 4.

Next, the wavelength division multiplexing transmission system will be further explained with detailed examples.

Figure 9:
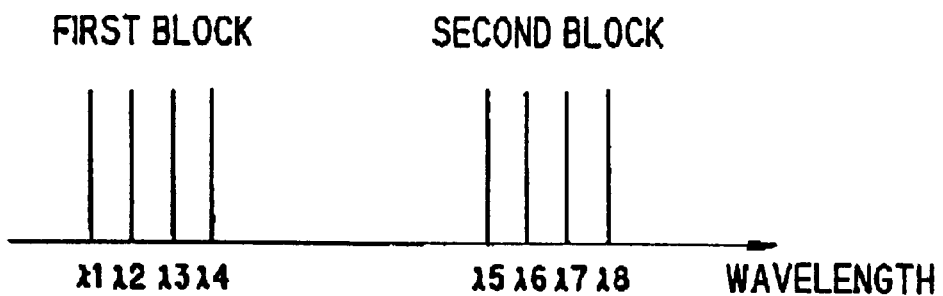
FIG. 9 is a diagram showing a specific example of a wavelength arrangement in the wavelength multiplexing transmission system in the embodiment.

FIG. 9 shows an example of a wavelength arrangement of signal lights with eight wavelengths in the wavelength division multiplexing transmission system. The signal lights are divided into two blocks. The wavelength interval in each block is equally 100 GHz (about 0.8 nm). The two blocks are of the first block including wavelengths $\lambda 1$ to $\lambda 4$ (1542.14 to 1544.53 nm) and the second block including wavelengths $\lambda 5$ to $\lambda 8$ (1561.42 to 1563.86 nm).

Figure 10:
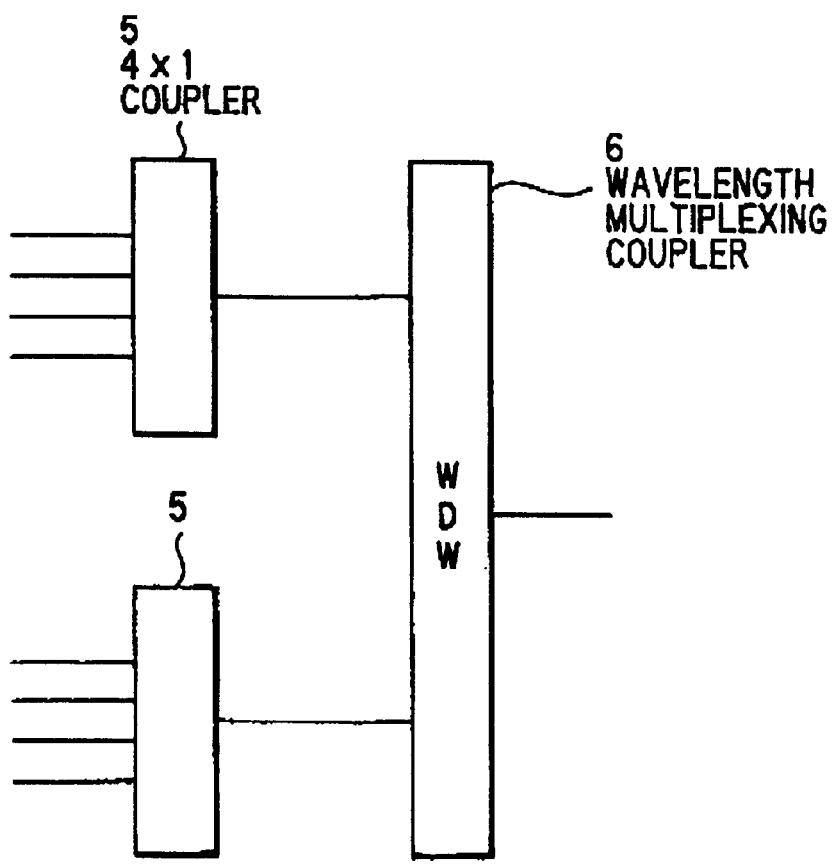
FIG. 10 is a block diagram showing a specific example of an optical multiplexer in the wavelength multiplexing transmission system in the embodiment.

FIG. 10 is a block diagram showing an example of an optical multiplexer for signal lights with eight wavelengths used in the wavelength division multiplexing transmission system. A 4×1 coupler 5 is an optical fiber type star coupler with an insertion loss of 7 dB. A wavelength multiplexing coupler 6 is of micro-optics type using dielectric multilayer film, which can perform wavelength multiplexing with an insertion loss of 1 dB when a wavelength interval of 15 nm or more is given.

In operation, single-wavelength signal lights with eight wavelength to be input is coupled into the respective blocks by the 4×coupler 5. Then, the first and second blocks are wavelength-multiplexed by the wavelength multiplexing coupler 6, thereby obtaining the wavelength-multiplexed signal light shown in FIG. 9. In this case, the insertion loss is 8 dB (=7 dB+1 dB). Thus, the insertion loss can be reduced by about 3 dB in comparison with that in the conventional optical multiplexer.

Figure 11:
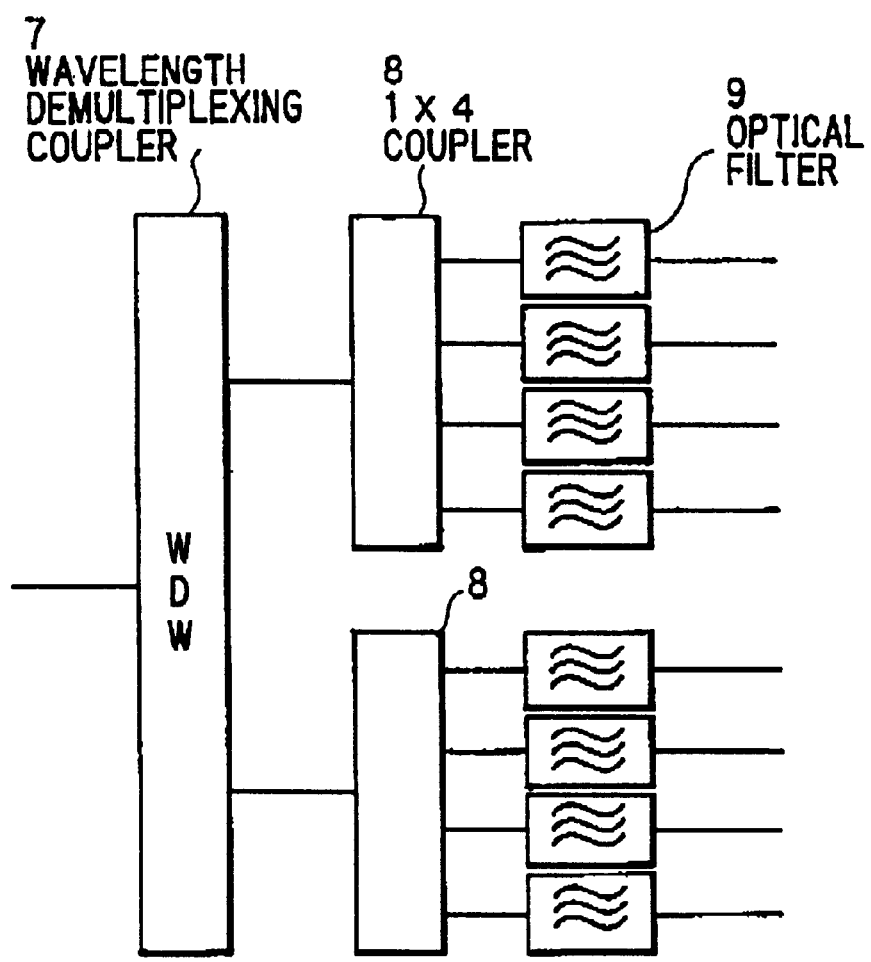
FIG. 11 is a block diagram showing a specific example of an optical demultiplexer in the wavelength multiplexing transmission system in the embodiment.

FIG. 11 is a block diagram showing an example of an optical demultiplexer for signal lights with eight wavelengths used in the wavelength division multiplexing transmission system. A wavelength demultiplexing coupler 7 is of micro-optics type using dielectric multilayer film, which can perform wavelength demultiplexing with an insertion loss of 1 dB when a wavelength interval of 15 nm or more is given. A 1×4 coupler 8 is an optical fiber type star coupler with an insertion loss of 7 dB. An optical filter 9 is of mirco-optics type with an insertion loss of 1 dB, which is composed of dielectric multilayer film that transmits only light with a center wavelength.

In operation, eight-wavelength-multiplexed signal light to be input is wavelength-demultiplexed into the first and second blocks. Then, each of the blocks is divided into four lights by the 1×4 coupler 8, and then necessary light is extracted from each of the lights by the optical filter 9. Thereby, the single-wavelength signal lights with eight wavelengths can be obtained. In this case, the insertion loss is 9 dB (=7 dB+1 dB+1 dB). Thus, the insertion loss can be reduced by about 3 dB in comparison with that in the conventional optical demultiplexer.

In the above embodiment, the wavelength multiplexing and demultiplexing means of the invention are applied to the multiplexing function of transmitter and the demultiplexing function of receiver. Furthermore, the wavelength multiplexing and demultiplexing means of the invention can be applied to a wavelength multiplexing transmission system with an optical add-drop function.

Figure 12A:
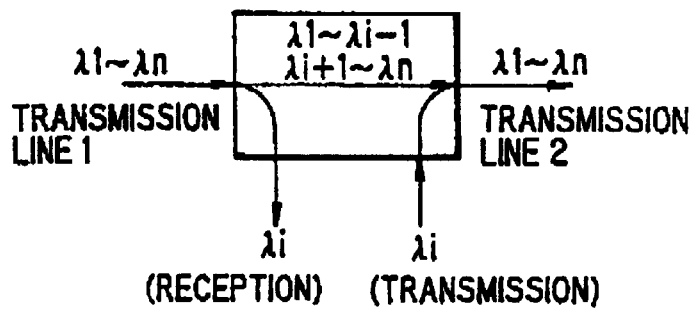
FIGS. 12A and 12B are block diagrams showing a wavelength multiplexing transmission system with an optical add-drop function in another preferred embodiment according to the invention.
Figure 12B:
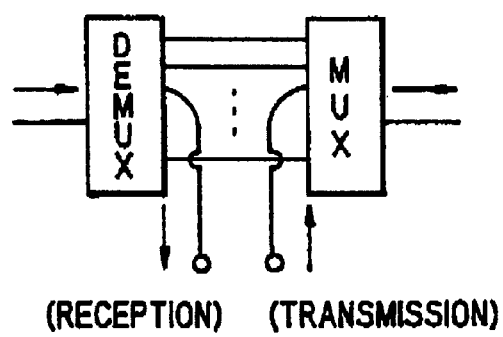

FIGS. 12A and 12B show a wavelength multiplexing transmission system with an optical add-drop wavelength multiplexing or demultiplexing function.

The optical add-drop wavelength multiplexing or demultiplexing function is to separate only a predetermined wavelength signal from wavelength-multiplexed signal light, or to insert an optical wavelength signal into an unused predetermined wavelength signal position or a wavelength position spaced after branching, on a transmission line or an optical wavelength multiplexing transmission system. For example, the optical add-drop wavelength multiplexing or demultiplexing means, as shown in FIG. 12A, serves to receive separating an optical wavelength signal λi from a wavelength-multiplexed signal (λi to λn) and to transmit inserting another optical wavelength signal λi. Specifically, as shown in FIG. 12B, the optical add-drop wavelength multiplexing or demultiplexing means is composed of a demultiplexer for demultiplexing a wavelength-multiplexed signal, a multiplexer for multiplexing several wavelength signals, and a separated receiver-transmitter for receiving and transmitting only an optical drop wavelength signal. Meanwhile, the signal light to be separated or inserted may be a block of wavelength-multiplexed signal lights, as described above, other than single-wavelength signal light. In this wavelength multiplexing or demultiplexing manner, the combination of wavelength multiplexing, wavelength demultiplexing and optical coupling in the above embodiment can be also used.

Figure 13:
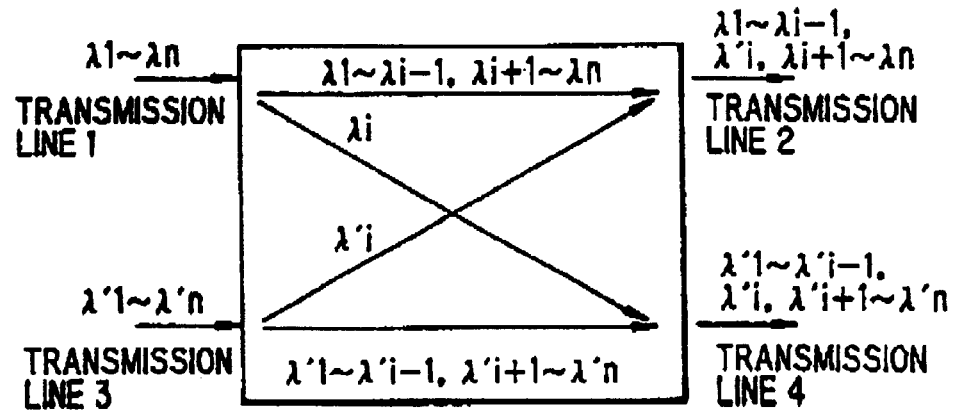
FIG. 13 is a block diagram showing an optical path cross connection system in a preferred embodiment according to the invention.

FIG. 13 is an illustration showing an optical path cross connection system in the preferred embodiment of the invention, where the wavelength multiplexing described above is used.

The optical path cross connection system shown in FIG. 13 serves to exchange wavelength-multiplexed signal light. Specifically, transmission lines 1, 3 on the input side and transmission lines 2, 4 on the output side for transmitting wavelength-multiplexed signal light are cross-connected, where signal lights λi, λ'i of the wavelength-multiplexed signal light transmitted through the transmission lines 1, 3 are mutually transferred to the other transmission lines 2, 4. In this wavelength multiplexing exchange system, the signal light to be exchange may be a block of wavelength-multiplexed signal lights, as described above, other than single-wavelength signal light. Also, the combination of wavelength multiplexing, wavelength demultiplexing and optical coupling in the above embodiment can be also used.

In the above embodiment, the optical circuit or optical parts may be altered. For example, the 4×1 coupler 5 may be of micro-optics type or waveguide type, other than an optical fiber type star coupler. Also, the number or ratio of branching may be other than 4×1 . Further, the star coupler may be partially replaced by a wavelength demultiplexing coupler.

Also, wavelength multiplexing coupler 6 or wavelength demultiplexing coupler 7 may be of an optical fiber type or waveguide type coupler, other than a micro-optics type coupler using dielectric multilayer film.

The optical filter 9 may be of Fabry-Perot interferometer type, fiber grating or waveguide type, other than a micro-optics type filter. The signal light may have a wavelength band of 1300 nm or the other band, other than a wavelength band of 1551 nm.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for wavelength-multiplexing signal lights with three or more wavelengths comprising the steps of: providing at least a wavelength block of signal light with one wavelength and a wavelength block where signal lights of two or more wavelengths are wavelength-multiplexed or providing a plurality of wavelength blocks where signal lights of two or more wavelengths are wavelength-multiplexed;

setting a wavelength interval between adjacent wavelength blocks to be wider than a wavelength interval between signal lights in a wavelength block;

using a wavelength multiplexing coupler for wavelength multiplexing said wavelength blocks; and using a wavelength demultiplexing coupler of mircooptics type having a dielectric multilayer film for wavelength demultiplexing said wavelength blocks.

2. A wavelength multiplexing transmission system for transmitting signal lights with three or more wavelengths through an optical fiber transmission line, comprising:

at least a wavelength block of signal light with one wavelength and a wavelength block where signal lights with two or more wavelengths are wavelength-multiplexed or a plurality of wavelength blocks where signal lights with two or more wavelengths are wavelength-multiplexed;

wherein a wavelength interval between adjacent wavelength blocks is wider than a wavelength interval between signal lights in a wavelength block; and wherein wavelength multiplexing or demultiplexing is performed using a coupler of the micro-optics type having a dielectric multilayer film.

3. A wavelength multiplexing transmission system, according to claim 2, wherein:

said wavelength block is coupled or divided by using a wavelength multiplexing function.

4. A wavelength multiplexing transmission system, according to claim 3, wherein:

said wavelength block is coupled or divided by using an optical add-drop function comprising:

a single demultiplexer in said optical fiber transmission line for dropping a particular one of said wavelength blocks; and a single multiplexer in said in said optical fiber transmission line for adding a new wavelength block to said multiplexed signal.

5. A wavelength multiplexing transmission system as recited in claim 3, wherein:

a signal light in said wavelength block is coupled or divided by using an optical add-drop function.

6. A wavelength multiplexing transmission system, according to claim 2, wherein:

said signal light in said wavelength block is coupled or divided by using an optical coupler.

7. A wavelength multiplexing transmission system, according to claim 6, wherein:

said wavelength block is coupled or divided by using an optical add-drop function comprising:
 a single demultiplexer in said optical fiber transmission line for dropping a particular one of said wavelength blocks; and
 a single multiplexer in said in said optical fiber transmission line for adding a new wavelength block to said multiplexed signal.

8. A wavelength multiplexing transmission system as recited in claim 6, wherein:

a signal light in said wavelength block is coupled or divided by using an optical add-drop function.

9. A wavelength multiplexing transmission system, according to claim 3, wherein:

said signal light in said wavelength block is coupled or divided by using an optical coupler.

10. A wavelength multiplexing transmission system, according to claim 2, wherein:

said wavelength block is coupled or divided by using an optical add-drop function comprising:

a single demultiplexer in said optical fiber transmission line for dropping a particular one of said wavelength blocks; and a single multiplexer in said in said optical fiber transmission line for adding a new wavelength block to said multiplexed signal.

11. A wavelength multiplexing transmission system as recited in claim 2, wherein:

a signal light in said wavelength block is coupled or divided by using an optical add-drop function.

12. An optical path cross connection system for exchanging wavelength multiplexed signal light where signal lights with three or more wavelengths are wavelength multiplexed, wherein:

a wavelength arrangement is made by proving at least a wavelength block of signal light with one wavelength and a wavelength block where signal lights with two or more wavelengths are wavelength multiplexed or a plurality of wavelength blocks where signal lights with two or more wavelengths are wavelength multiplexed, and by setting a wavelength interval between adjacent blocks to be wider than a wavelength interval between signal lights in a wavelength block; and wherein wavelength multiplexing or demultiplexing is performed using a coupler of the micro-optics type having a dielectric multilayer film.

13. A method for wavelength multiplexing light signals having an add/drop function, comprising:

providing a plurality of light channels;

dividing said light channels into a plurality of blocks each comprising one or more spaced frequencies;

separating adjacent said blocks by a frequency separation larger than a frequency separation of said light channels in said blocks;

multiplexing light channels in each of said blocks to produce a plurality of intermediate multiplexed signals;

multiplexing said plurality of intermediate multiplexed signals to produce a multiplexed signal containing said plurality of light channels for transmission over a fiber;

providing a signal demultiplexer for in said fiber path for dropping a particular one of said blocks from said multiplexed signal;

providing a signal multiplexer in said fiber path for adding a new block to said multiplexed signal.

14. A method for wavelength multiplexing light signals having an add/drop function as recited in claim 13 wherein said step of multiplexing light channels in each of said blocks is accomplished by providing a star coupler.

15. A method for wavelength multiplexing light signals having an add/drop function as recited in claim 13 wherein said step of multiplexing light channels in each of said blocks is accomplished by providing a waveguide coupler.

16. A method for wavelength multiplexing light signals having an add/drop function as recited in claim 13 wherein said step of multiplexing said plurality of intermediate multiplexed signals is accomplished by providing a waveguide coupler.

* * * * *